Feb. 15, 1955 J. A. GINTLING 2,702,028
IGNITION CONTROL APPARATUS
Filed Dec. 16, 1952
Fig. 1.
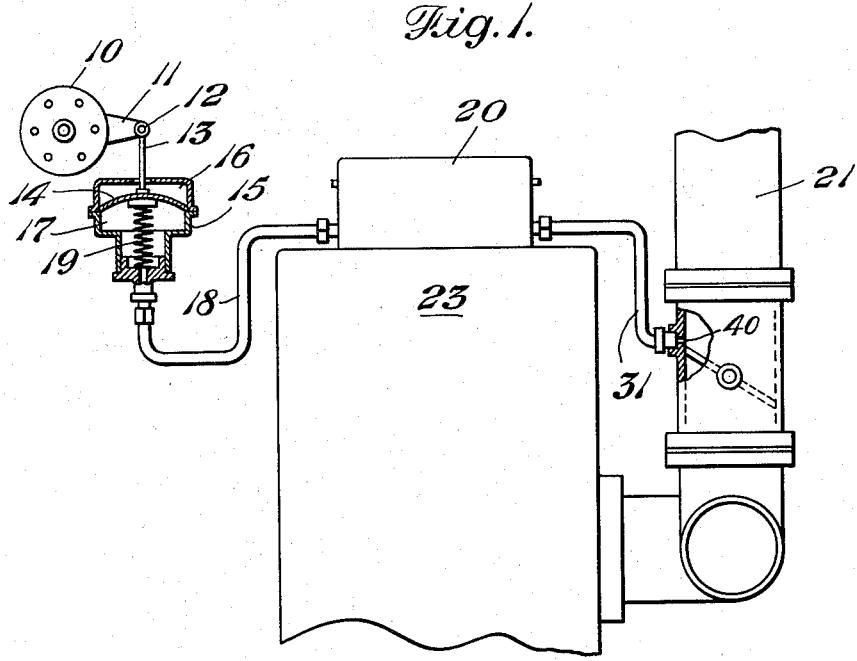
Fig. 2.
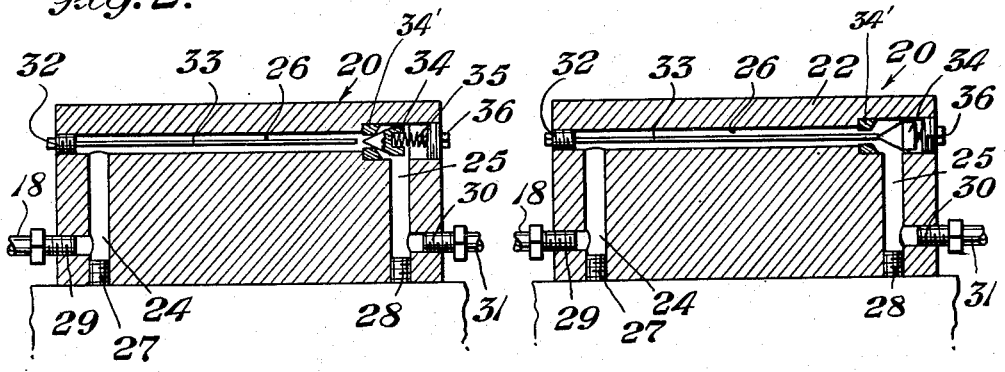
Fig. 3.
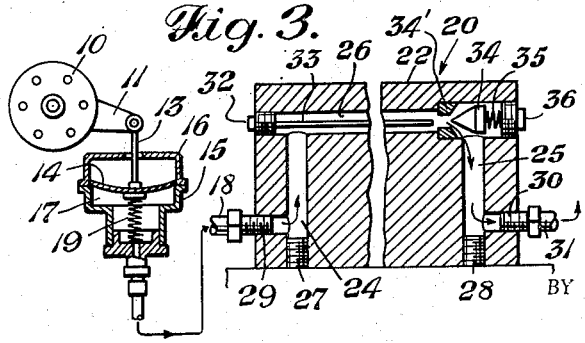
Fig. 4.
INVENTOR
John A. Gintling,
BY
Karl W. Flocks
ATTORNEY

United States Patent Office 2,702,028
Patented Feb. 15, 1955

---

2,702,028

IGNITION CONTROL APPARATUS

John A. Gintling, Baltimore, Md., assignor of one-half to Theodore M. Waranch, Baltimore, Md.

Application December 16, 1952, Serial No. 326,327

5 Claims. (Cl. 123—117)

This invention relates to an automatic spark advance control for internal combustion engines, and more particularly to an automatic spark control for such engines designed to operate while the engine is cold.

Automatic ignition controllers which adjust the timing of the ignition solely in accordance with the speed of the engine are well known. These devices are of the centrifugal type and the amount of advance depends entirely upon the speed of the engine with the spark advance increasing as the speed increases. However, in such devices, there is no provision made for varying the spark setting at a constant speed and a variable load, nor for advancing the spark while the engine is cold. This method is quite satisfactory as long as the car is driven on a level road, but while climing a hill, coasting, or driving down a slight incline at the same speed, the constant spark advance provided by the device incorporated in the distributor does not permit the engine to run sufficiently smooth. Thus, if the spark is adjusted initially for good fuel economy at light load, it would tend to introduce knocking at heavy load, and if the amount of spark advance is sufficiently reduced to prevent knocking at heavy load, the fuel economy and smoothness at light load becomes unsatisfactory.

To overcome this defect in the control of the ignition by speed, various devices have been invented wherein, for a given engine speed, the ignition timing is advanced or retarded according to the amount of the vacuum in the intake pipe of the engine.

Although this type of vacuum spark advance has been generally satisfactory, it has been found lacking in performance when the engine is cold. When the engine is cold, it is essential that the spark timing be kept fully advanced until the engine has warmed up due to the slower burning characteristics of the fuel when the engine is cold.

With the above objections to the present constructions definitely constituted, the present invention has as its principal object to provide an improved vacuum spark advance mechanism capable of direct connection to the cylinder head of the engine, the distributor and the carburetor thereof.

A further object of the present invention is to provide an improved vacuum spark advance mechanism with improved operation while the engine is cold.

A still further object of the present invention is to provide an improved valve member to hold the spark fully advanced while the engine is cold.

A still further object of the present invention is to provide a vacuum spark advance mechanism controlled by a valve attached to the cylinder head of the engine which valve is actuated by the heat thereof.

A still further object of the present invention is to provide a valve which is capable under certain conditions of closing the conduit connecting the carburetor with the spark advance mechanism.

A still further object of the present invention is to provide an entirely automatic spark advance mechanism capable of more efficient operation while the engine is cold reverting to normal operation when the engine has warmed up.

These and other objects of the invention are accomplished by the following invention, wherein a heat responsive valve attached to the cylinder head and actuated by the heat of the engine is located in the conduit connecting the vacuum line from the carburetor to the distributor.

Other objects and advantages of this construction will be more apparent from the following description wherein reference is made to the accompanying drawings, in which:

Fig. 1 is a generally diagrammatic view of the invention with the spark set in the retarded position;

Fig. 2 is a vertical horizontal cross-section of the valve portion of Fig. 1 showing the position of the valve while the engine is cold and there is no vacuum in the lines;

Fig. 3 is a generally diagrammatic cross-sectional view showing the spark set in the fully advanced position, and showing the position of the valve while the engine is cold and the vacuum has developed in the carburetor; and Fig. 4 is a cross-section similar to Fig. 2, showing the position of the valve after the engine has warmed up.

Referring to the drawings, 10 represents a conventional distributor having an arm 11 pivotally connected at 12 to a rod 13. The rod 13 is attached to one side of a diaphragm 14. The diaphragm 14 may be mounted in a housing 15 having a chamber 16 on one side of the diaphragm and a chamber 17 on the opposite side thereof. The chamber 16 is open to the atmosphere, whereas the chamber 17 is connected to a conduit 18. A coiled spring 19 normally holds the diaphragm in the position shown in Fig. 1, in what is known as the retarded position.

The distributor 10 is provided with the usual type of centrifugal spark advance, not illustrated, which usually includes weights which fly outwardly as the distributor drive shaft revolves at a continually increasing rate, and in the usual manner advance the timing of the ignition.

The valve unit 20 is positioned between the distributor 10 and the carburetor 21 in the conduit 18. The valve unit 20 is located in a cast iron block 22 which is directly attached to the cylinder head 23 of the engine. The block 22 is provided with a generally U-shaped passageway therethrough including two parallel passageways 24 and 25 and a longer passageway 26 connecting one of the ends of each passageway 24 and 25. A plug 27 is screwed into the other end of the passageway 24, thereby closing it. A plug 28 likewise is screwed into the other end of the passageway 25, thereby closing it. Adjacent to the plugs 27 and 28 connected to passageways 24 and 25 are provided passageways 29 and 30, respectively, leading out of the block 22. Conduit 18, which is connected at one end to the chamber 17, as previously described, is connected at its other end to the passageway 29. Conduit 31 connects passageway 30 with the carburetor 21.

Located in passageway 26 at one end thereof is an adjusting plug 32 to which is attached a long thin expansible rod 33 which extends substantially the length of passageway 26. At the other end of passageway 26 is located a valve 34 actuated by a spring 35 extending from the valve to an adjusting plug 36. Adjusting plugs 32 and 36 extend through the block 22 and may be adjusted from the outside of the block. The valve 34, which is a one-way acting valve, is normally held by the spring 35 against its seat 34' in a position blocking off the passageway 25 from passageway 26 when the engine is cold and when there is no vacuum in the lines. The rod 33 is preferably made of aluminum or any other metal which expands sufficiently with heat to move the valve 34 from the position shown in Fig. 2, where it is in contact with the valve seat 34', thereby blocking off the passageway 25 to the position shown in Fig. 4, wherein the valve is forced rearwardly off of its seat and the passageways 25, 26 are in communication. The one-way acting valve 34 may be cracked from its seat 34' by means of the vacuum building up in the carburetor 21, while the engine is still cold, thereby forming a vacuum in the passageways 26 and 24 and acting on the diaphragm 14 to move it to the position shown in Fig. 3, whereupon the distributor is adjusted to the fully advanced position. When the vacuum on both sides of the one-way acting valve 34 is equal, then the spring 35 will force the valve 34 against its seat 34', thereby closing off the passageway 25 and maintaining the maximum vacuum previously attained in the passageways 26 and 24 and maintaining the diaphragm and distributor in the fully advanced position. The location of the block 22 directly on the cylinder head 23 results in the block being in heat exchange relationship with the cylinder head so that as the engine warms up the heat of the engine is transferred directly from the cylinder head to the block 22 and thence to the expansible rod 33.

The conduit 31 is directly connected to a port 40 of a down-draft carburetor 21. In operation, while the engine is cold and before it has been started, the expansible rod 33 is in the retracted position, as shown in Fig. 2, and the valve 34 is forced against its seat 34' by the spring 35 and the distributor is in the retracted position as indicated in Fig. 1, wherein the diaphragm 14 is actuated by its spring 19 to the upward position indicated. In this position, the spark setting is in the retracted position. When the engine is still cold and the engine is started and vacuum builds up in the carburetor 21, the valve 34 is cracked from its seat 34' by the vacuum in the passageway 25, thereby forming a vacuum in passageways 26, 24 and 18, which acts on the diaphragm 14 to force it downwardly against the action of its spring 19, to the position shown in Fig. 3. In this position, the spark setting is in the fully advanced position and the setting will remain as long as the engine is cold. If the vacuum in passageway 25 is reduced below that in passageway 26, the valve 34 will be forced to close against its seat 34' by its spring and the vacuum in the passageway 26 will remain so long as the engine is cold. As the engine warms up, expansible rod 33 expands, thereby contacting the valve 34 and moving it rearwardly from its seat 34', thereby uncovering passageway 25 and permitting communication therebetween. In this position of the valve, as shown in Fig. 4, the vacuum in the carburetor acts directly on the diaphragm 14 through passageways 31, 30, 25, 26, 24, 29 and 18. The vacuum transmitted to chamber 17 pulls the diaphragm against its spring 19, thus actuating the rod 13 and advancing the spark setting of the distributor 10 proportionally to both the speed of the engine and the vacuum in the carburetor. Thus, once the engine has warmed up, the vacuum in the carburetor and the speed of the engine act directly and automatically to control the setting of the spark. However, when the engine is cold, the heat responsive valve closes off the passageway connecting the carburetor with the spark advance control mechanism whereby the spark is maintained in the fully advanced position until the heat of the engine automatically opens the passageway so that the spark advance control mechanism can operate in its normal manner.

It will be obvious to those skilled in the art that various changes may be made without departing from the spirit of the invention and the invention is not limited to what is shown in the drawings and described in the specification, but only as indicated in the appended claims.

What is claimed is:

1. A control device for use in an internal combustion engine provided with an intake passage and having a carburetor throttle valve, comprising an automatic spark control device for advancing and retarding the ignition timing actuated by a diaphragm having atmospheric pressure acting normally on one of its sides and being adapted to be subjected to vacuum control on its other side, a vacuum take-off adjacent said throttle valve, a passageway connecting said vacuum take-off with the other side of said diaphragm, a valve seat and valve means for automatically closing off said passageway when the engine is cold and heat responsive means adapted to expand when the engine has warmed up and move said valve means from said valve seat thereby opening said passageway to said diaphragm and permitting automatic operation of said automatic spark control device.

2. A control device in accordance with claim 1, wherein said heat responsive means includes an expansible rod mounted in heat exchange relation with the cylinder head of the engine adapted when the engine has warmed up to expand and contact said valve thereby moving said valve from said valve seat.

3. A control device in accordance with claim 1, wherein said heat responsive means is mounted in heat exchange relation with the cylinder head of said engine.

4. Ignition controlling apparatus for internal combustion engines comprising in combination, a spark controlling device actuated automatically by the suction of the engine for advancing and retarding the ignition timing, and heat responsive means including a valve seat, a spring actuated valve adapted to seat on said valve seat thereby maintaining said spark controlling device in advanced position when the engine is cold and an expansible rod adapted to expand when the engine has warmed up and moved said valve from said valve seat thereby permitting automatic operation of said spark controlling device.

5. In apparatus in accordance with claim 4 wherein said heat responsive means is mounted in heat exchange relation with the cylinder head of said engine.

References Cited in the file of this patent

UNITED STATES PATENTS

| | | |
|---|---|---|
| 1,785,902 | Hardman | Dec. 23, 1930 |
| 2,378,037 | Reggio | June 12, 1945 |
| 2,451,289 | Jarvis | Oct. 12, 1948 |